April 18, 1967 J. MERCIER Re. 26,195

HYDRAULIC SERVO-SYSTEM

Original Filed June 27, 1961

INVENTOR.
JEAN MERCIER

BY

Dean, Fairbank & Hirsch
ATTORNEYS

United States Patent Office

Re. 26,195

Reissued Apr. 18, 1967

26,195

HYDRAULIC SERVO-SYSTEM

Jean Mercier, 501 Bloomfield Ave., Caldwell, N.J. 07006

Original No. 3,152,448, dated Oct. 13, 1964, Ser. No. 120,081, June 27, 1961. Application for reissue Oct. 5, 1966, Ser. No. 589,172

4 Claims. (Cl. 60—54.5)

Matter enclosed in heavy brackets [ ] appears in the original patent but forms no part of this reissue specification; matter printed in italics indicates the additions made by reissue.

This invention relates to the art of servo-systems, more particularly of the hydraulic type.

It is among the objects of the invention to provide a hydraulic servo-system which has but relatively few parts, not likely to become deranged even with long use, that is relatively simple to construct and includes a transmitter that may be operated with but a relatively simple manipulation, to deliver fluid under pressure to a hydraulically controlled unit to effect displacement of such unit by an amount proportional to the displacement of the transmitter and which will automatically compensate for variations in ambient temperature that may cause thermal expansion or contraction of the hydraulic fluid in the system and which also may readily be reset for calibration thereof.

According to the invention, these objects are accomplished by the arrangement and combination of elements hereinafter described and more particularly recited in the claims.

This application is a continuation-in-part of copending application Serial No. 42,000, filed July 12, 1960, now abandoned.

Figure 1:
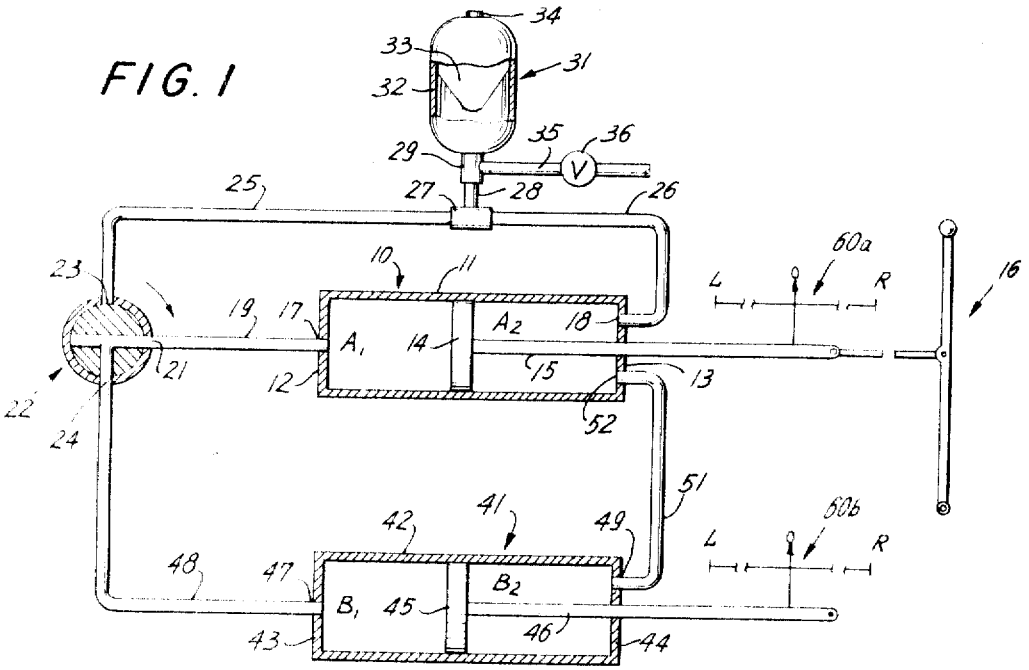
Figure 2:
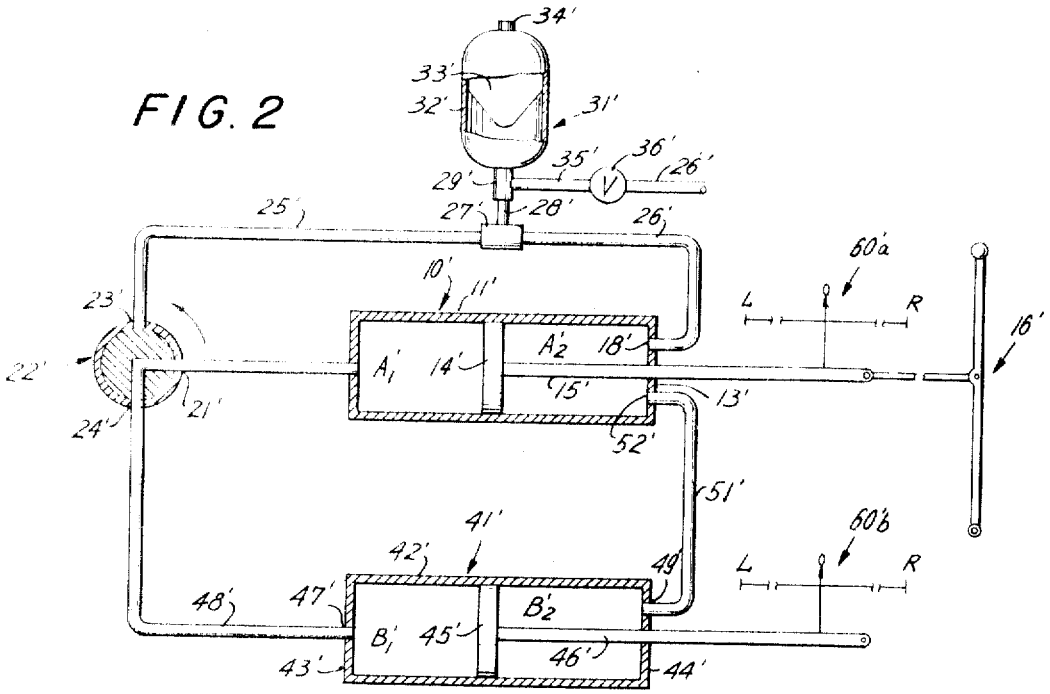

In the accompanying drawings in which is shown one or more of various possible embodiments of the several features of the invention, FIG. 1 is a diagrammatic view of one embodiment of the system, and FIG. 2 is a view similar to FIG. 1 of another embodiment.

Referring now to the drawings, the servo-system includes a hydraulic pressure transmitter 10, desirably comprising a substantially cylindrical casing 11 having end walls 12 and 13 and having a piston 14 slidably mounted *therein with a piston rod* 15 affixed at one end thereto and having its other end extending through the end wall 13. Suitable control means 16 are provided to move the piston 14 from one end of the casing 11 to the other.

Each of the end walls 12 and 13 of the casing 11 has a port 17 and 18. The port 17 is connected by line 19 to the port 21 of a selector valve 22, said valve having additional ports 23 and 24. In one position of the valve, the ports 21 and 24 are connected and in another position of the valve, the ports 23 and 24 are connected.

The port 23 of valve 22 and the port 18 of casing 11 are connected respectively by lines 25 and 26 to junction 27 which in turn is connected by line 28 to the oil port 29 of a pressure vessel 31, illustratively a pressure accumulator of any conventional type.

As illustratively shown, the pressure accumulator comprises a rigid casing 32 in which a deformable partition 33, preferably a bladder, is positioned, said bladder being designed to be charged with fluid such as gas under pressure through port 34 and the pressure vessel being designed to be charged with fluid such as oil under pressure, slightly above atmospheric, through line 35 which is thereafter closed by a valve 36.

The pressure transmitter 10 is designed to control a hydraulic unit 41, which also desirably comprises a substantially cylindrical casing 42 having end walls 43 and

44 and having a piston 45 slidably mounted therein, said piston having a piston rod 46 affixed thereto at one end and having its other end extending through the end wall 44, said piston rod controlling any suitable movable member. The end wall 43 of hydraulic unit 41 has a port 47 connected by line 48 to port 24 of valve 22 and the end wall 44 has a port 49 connected by line 51 to a port 52 in end wall 13 of pressure transmitter 10.

In the embodiment shown, the dimensions of the pressure transmitter 10 and the hydraulic unit 41 are so selected that when the pistons 14 and 45 thereof are in the central position in the associated casings 11 and 42, the volume of chamber $A_1$ will be substantially equal to the volume of chamber $B_1$ and the volume of chamber $A_2$ will be substantially equal to that of chamber $B_2$ and the effective area of each of the surfaces of pistons 14 and 45 in chambers A, B, is greater than that of the surfaces of said pistons in chambers $A_2$, $B_2$ due to the piston rods in said latter chambers.

In the operation of the unit, assuming that the chambers $A_1$, $A_2$ and $B_1$, $B_2$ are filled with fluid and that the pistons 14 and 45 are in the central position shown, with valve 22 connecting ports 21, 24, if the piston 14 is moved to the left, such movement of piston 14, will force fluid from chamber $A_1$ into chamber $B_1$, thereby causing the piston 45 to move to the right a corresponding amount.

If piston 14 is moved to the right from the central position, the pressure in chamber $B_1$ on the left side of piston 45 will fall to zero and since the chamber $B_2$ is subjected to the pressure in the accumulator 31, as well as that from chamber $A_2$, the piston 45 will move to the left by an amount related to the movement of piston 14 to the right.

If, for example, due to leakage past the pistons in the units 10 and 41, they should become out of alignment, i.e., when the piston 14 of pressure transmitter 10 is in its central position the piston 45 of hydraulic unit 41 should be to the left or right of its central position the system may readily be calibrated.

To this end, with the valve 22 in position connecting ports 21 and 24, the piston 14 is moved to the extreme left. Thereupon, the valve 22 is turned to connect ports 23 and 24. At this time, the chamber $B_1$ will be connected directly to the accumulator and chamber $A_1$ cut off and although the chamber $B_2$ is also connected to the accumulator, due to the greater active area of the left side of piston 45 which does not have the piston rod 46 connected thereto, the piston 45 will be moved by the accumulator pressure in chamber $B_1$ to its extreme right position.

In the embodiment shown in FIG. 2, which is substantially identical to that shown in FIG. 1, identical parts have the same reference numerals primed.

In the embodiment of FIG. 2, the valve 22' is designed in one position to connect ports 21' and 24' and in a second position to connect ports 21' and 23'.

Thus, in normal operation of the embodiment shown in FIG. 2, when ports 21' and 24' of valve 22' are connected, when the piston 14' is moved to the left, the piston 45' will be moved to the right. If piston 14' is moved to the right the pressure in chamber $B'_1$ to the left of piston 45' will fall to zero and since the chamber $B'_2$ is connected to the accumulator 31' the piston 45' will be moved to the left.

To reset the system shown in FIG. 2, in the event the pistons are out of alignment, the valve 22' is positioned so that ports 21' and 23' are connected. This effectively seals the port 47' of chamber $B'_1$ so that no fluid can escape or be discharged therefrom. The piston 14' of transmitter 10 is then moved by member 16' to a position on its indicator 60'a corresponding to the position of the piston 45' of unit 41' on its indicator 60'b. Thereupon, for normal operation of the device, the valve 22' is set so that ports 21' and 24' are connected.

It is apparent from the foregoing that when the piston 14, 14' of pressure transmitters 10, 10' is moved either to the left or to the right in normal operation of the unit, the piston 45, 45' of hydraulic unit 41, 41' will move in the opposite direction an amount directly proportional to the amount of movement of the piston 14, 14' of pressure transmitter 10, 10' and the position of the piston 45, 45' and the movable member controlled thereby will be shown by indicators 60a, 60b, 60'a, 60'b. Thus, remote control may readily be effected of the movable member, such as a bulkhead door from, say, the bridge of a ship.

In the event of thermal expansion of the hydraulic fluid in the system, the resultant increase of the volume of the fluid and resultant increase in pressure will cause excess fluid to flow into the accumulator 31, 31' to avoid the possibility of rupture of any portion of the system.

In the event of thermal contraction of the hydraulic fluid in the system, the resultant decrease in the volume of the fluid will cause decrease in pressure so that due to the pressure on the fluid in the accumulator 31, 31', fluid will flow from the accumulator into chambers $A_2$ and $B_2$; $A'_2$ and $B'_2$ of the system when the valve 22, 22' is in the position shown and thereupon the system may then be recalibrated in the manner above described to compensate for descrease in the amount of fluid in chambers $A_1$, $B_1$ and $A'_1$, $B'_1$.

It is of course to be understood that the position of the hydraulic unit 41, 41' may readily be transmitted to the location of the transmitter 10, 10' by any suitable electrical system.

With the relatively simple system above described, movement of a hydraulically controlled unit by an amount proportional to the displacement of the movement of the transmitter may readily be accomplished and resetting of such units may also be readily accomplished, by a simple manipulation.

As many changes could be made in the above constructions and many apparently widely different embodiments of this invention could be made without departing from the scope of the claims, it is intended that all matter contained in the above description or shown in the accompanying drawings shall be intrepreted as illustrative and not in a limiting sense.

Having thus described my invention, what I claim as new and desire to secure by Letters Patent of the United States is:

1. A hydraulic servo-system comprising a pressure transmitter comprising a casing having a piston slidably mounted therein, a hydraulic unit comprising a casing also having a piston slidably mounted therein, said pistons defining a chamber on each side thereof in the respective casings, means connecting the chambers on the respective sides of said pistons, the volume of the chambers defined on each side of the piston of the pressure transmitter when said pistons are in central position being at least equal to the volume of the corresponding chambers defined on each side of the piston of the hydraulic unit, whereby movement of the piston of the pressure transmitter will provide a movement of the piston of the hydraulic unit an amount proportional to such first movement, means providing a source of fluid under pressure greater than atmospheric, the means connecting the chambers on the respective sides of the pistons comprising a permanent connection between corresponding chambers on one side of the pistons of said pressure transmitter and said hydraulic unit with said source of fluid under pressure, and valve means interposed between said source of fluid under pressure and the chamers of said transmitter and said hydraulic unit on the other side of the pistons thereof, said valve means providing communication alternately between said last two chambers and between one of said last two chambers and the source of fluid for recharging of said transmitter and said hydraulic unit upon reduction in the volume of the fluid therein.

2. A hydraulic servo-system comprising a pressure transmitter unit and a hydraulic unit, each including a casing having a piston slidably mounted therein, and defining a chamber on each side thereof, each of said pistons having a piston rod secured thereto and extending through one end of the associated unit, whereby the effective area of the pistons in the chambers defined on one side thereof will be greater than the effective areas of the pistons in the chambers defined on the other side thereof, the volume of the chambers defined on each side of the piston of the pressure transmitter when said pistons are in central position being at least equal to the volume of the corresponding chambers defined on each side of the piston of the hydraulic unit, a source of fluid under pressure greater than atmospheric, a two position valve having at least three ports, means connecting the first and second of said ports to the chambers of the pressure transmitter and the hydraulic units in which the larger effective area of the associated piston is exposed, means connecting the third of said ports to said source of fluid under pressure and to the chamber of said pressure transmitter in which the smaller effective area of the associated piston is exposed, means connecting said last named chamber of said pressure transmitter and the corresponding chamber of said hydraulic unit, and means in one position of said valve to connect the first and second ports and shut off said third port and in a second position to connect said second and third ports and shut off said first port.

3. A hydraulic servo-system comprising a pressure transmitter unit and a hydraulic unit, each including a casing having a piston slidably mounted therein, and defining a chamber on each side thereof, each of said pistons having a piston rod secured thereto and extending through one end of the associated unit, whereby the effective area of the pistons in the chambers defined on one side thereof will be greater than the effective area of the pistons in the chambers defined on the other side thereof, the volume of the chambers defined on each side of the piston of the pressure transmitter when said pistons are in central position being at least equal to the volume of the corresponding chambers defined on each side of the piston of the hydraulic unit, a source of fluid under pressure greater than atmospheric, a two position valve having at least three ports, means connecting the first and second of said ports to the chambers of the pressure transmitter and the hydraulic units in which the larger effective area of the associated piston is exposed, means connecting the third of said ports to said source of fluid under pressure and to the chamber of said pressure transmitter in which the smaller effective area of the associated piston is exposed, means connecting said last named chamber of said pressure transmitter and the corresponding chamber of said hydraulic unit, and means in one position of said valve to connect the first and second ports and shut off said third port and in a second position to connect said first and third ports and shut off said second port.

*4. A hydraulic servo-system comprising a pressure transmitter unit and a hydraulic unit, each including a casing having a piston slidably mounted therein, and defining a chamber on each side thereof, each of said pistons having a piston rod secured thereto and extending through one end of the associated unit, whereby the effective area of the pistons in the chambers defined on one side thereof will be greater than the effective areas of the pistons in the chambers defined on the other side thereof, the volume of the chambers defined on each side of the piston of the pressure transmitter when said pistons are in central position being at least equal to the volume of the corresponding chambers defined on each side of the piston of the hydraulic unit, a source of fluid under pressure greater than atmospheric, means providing communication between the chambers of the pressure transmitter and the*

*hydraulic unit in which the larger effective area of the associated piston is exposed, means providing communication between the chambers of the pressure transmitter and the hydraulic unit in which the smaller effective area of the associated piston is exposed, and valve means having a reset position in which communication to one of the chambers of said hydraulic unit is cut off and the remaining chamber of said hydraulic unit and the two chambers of said pressure transmitter are connected to said source of fluid under pressure and an operating position in which the respective pairs of chambers of said pressure transmitter and said hydraulic unit are connected and the source of fluid under pressure is cut off from the chambers of said pressure transmitter in which the larger effective area of the associated piston is exposed.*

References Cited by the Examiner

The following references, cited by the Examiner, are of record in the patented file of this patent or the original patent.

UNITED STATES PATENTS

| | | | |
|---|---|---|---|
| 568,736 | 10/1896 | Brown | 60—54.5 |
| 2,315,270 | 3/1943 | Palmer | 60—54.5 |
| 2,540,879 | 2/1951 | Hebel et al. | 60—54.5 |
| 2,558,684 | 6/1951 | Haase | 60—54.5 X |
| 2,669,096 | 2/1954 | MacDuff | 60—54.5 |
| 3,040,533 | 6/1962 | Heinrich | 60—54.5 |

MARTIN P. SCHWADRON, *Primary Examiner*

R. R. BUNEVICH, *Assistant Examiner.*